April 28, 1970 S. N. WATKINS ET AL 3,509,463

SURFACE WAVE TRANSMISSION SYSTEM

Filed Dec. 29, 1967 3 Sheets-Sheet 1

INVENTORS
SAMMY N. WATKINS
TOMIO JOFUKU
ELMER D. WOODWARD

BY [signature] [signature]
ATTORNEY AGENT

INVENTORS
SAMMY N. WATKINS
TOMIO JOFUKU
ELMER D. WOODWARD
BY John F. Lawler ATTORNEY
Russell A. Cannon AGENT

INVENTORS
SAMMY N. WATKINS
TOMIO JOFUKU
ELMER D. WOODWARD

BY
ATTORNEY AGENT

United States Patent Office 3,509,463
Patented Apr. 28, 1970

3,509,463

SURFACE WAVE TRANSMISSION SYSTEM

Sammy N. Watkins, Cupertino, Elmer Donald Woodward, Los Altos, and Tomio Jofuku, Mountain View, Calif., assignors to Sylvania Electric Products Inc., a corporation of Delaware Filed Dec. 29, 1967, Ser. No. 694,651
Int. Cl. H04b 1/00, 3/00
U.S. Cl. 325—26 8 Claims

ABSTRACT OF THE DISCLOSURE

This surface wave transmission system comprises a pair of substantially identical wave launchers located at opposite ends of a single conductor surface wave transmission line, called a Goubau line. The line and launchers are supported vertically by a balloon which is tethered to a ground station by the line. The launchers are substantially identical coaxial transmission lines and each comprises a trough-shaped conductive sleeve centered in a conductive cylinder having one end flared to form a horn. The Goubau line is clamped in the trough of the sleeve and extends through the horn. A ridged waveguide coupler electrically connected to the sleeve at the other end of the cylinder provides broadband transmission of RF signals between the Goubau line and utilization apparatus connected to the coupler. Each horn comprises two half sections adapted to be clamped to the Goubau line at any point along its length without interfering with the tethering function of the line.

BACKGROUND OF THE INVENTION

This invention relates to surface wave transmission lines and more particularly to a system for launching and receiving signals transmitted on a single conductor tether line for a balloon or similar lift device.

The single conductor transmission line is described by Georg Goubau in Proceedings of I.R.E., June 1951, page 619, and has useful application for example, in transmitting electrical signals while functioning as a tether for a meteorlogical balloon. The Goubau line is especially advantageous because of its broadband and low loss characteristics and is ideally suited for support by a balloon in conjunction with wave launchers at ground and elevated locations for coupling waves to and removing waves from the line. The disadvantage of such a transmission system is the band limiting characteristics of the launchers.

An object of this invention is the provision of a broadband surface wave transmission system.

A more specific object is the provision of such a transmission system with wave launchers having broadband couplers for transferring energy between the line and utilization apparatus associated therewith.

The use of a balloon tether as a surface wave transmission line gives rise to problems of combining the mechanical and electrical functions of the line. As a tether, the line is usually wound on a winch and is capable of being reeled in and out during lowering and raising of the balloon. When this occurs, provision must be made for mechanically connecting and disconnecting the wave launchers to the line without however interrupting the anchoring function of the line as a tether. In the past, the Goubau line has been mechanically secured to the wave launcher body, but this arrangement is unsuitable for balloon tethering because of the mechanical stresses developed in the line and in the launcher structure. In other arrangements, the launcher has been mounted on the tether line like a bead on a string, but this technique is impracticable in the balloon tether application because of the relative movement between the line and ground station launcher when the balloon is reeled in and out.

Another object of this invention is the provision of a transmission system of the type described with a launcher that may be clamped to the line at any point therealong after the latter has been extended.

SUMMARY OF THE INVENTION

The tether-transmission line system utilizes two-piece or split structure launchers which are clamped on the line to provide both mechanical and electrical coupling to the line. The inner conductor of each launcher is slotted throughout its length for receiving the conductive tether line and is directly electrically connected to a ridged waveguide designed to provide broadband coupling between the launcher and external circuits without frequency dependent tuning devices.

DESCRIPTION OF PREFERRED EMBODIMENT

Figure 1:
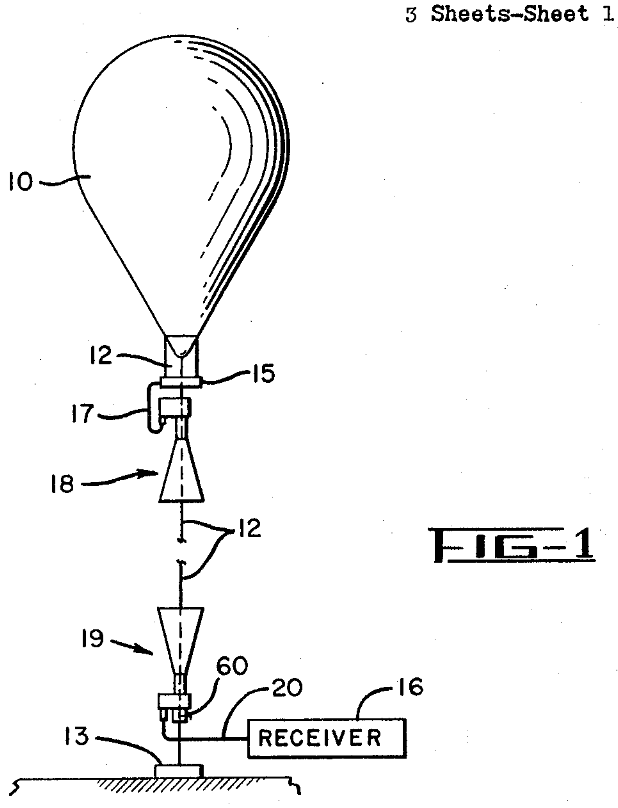
FIGURE 1 is a schematic view of a system embodying this invention.

A preferred embodiment of the invention is illustrated in FIGURE 1 as an elevated meteorological balloon 10 connected by a tether line 12 to a ground anchor mechanism such as a winch 13. Tether line 12 is a single conductor surface wave transmission line. A radio frequency signal generator 15, which produces RF signals representative of temperature, pressure, humidity, and the like, is mounted on or adjacent to balloon 10 and produces such meteorological data at appropriate elevations above the ground. In order to transmit these data to a receiver 16 at the ground station, generator 15 is connected by line 17 to a wave launcher 18 on line 12 adjacent to the balloon. A corresponding wave launcher 19 is similarly mounted on the tether line adjacent to the ground and is electrically connected on line 20 to the receiver 16. The information produced by generator 15 is converted by launcher 18 to a surface wave on tether line 12 which is received by launcher 19 for application to receiver 16. Thus, the tether line serves the dual function of mechanically anchoring the balloon to winch 13 and transmitting radio frequency waves from the elevated sensor (generator 15) to the ground station receiving apparatus.

Launchers 18 and 19 are substantially identical in construction and mode of operation and therefore only one of them will be described in this specification.

Figure 2:
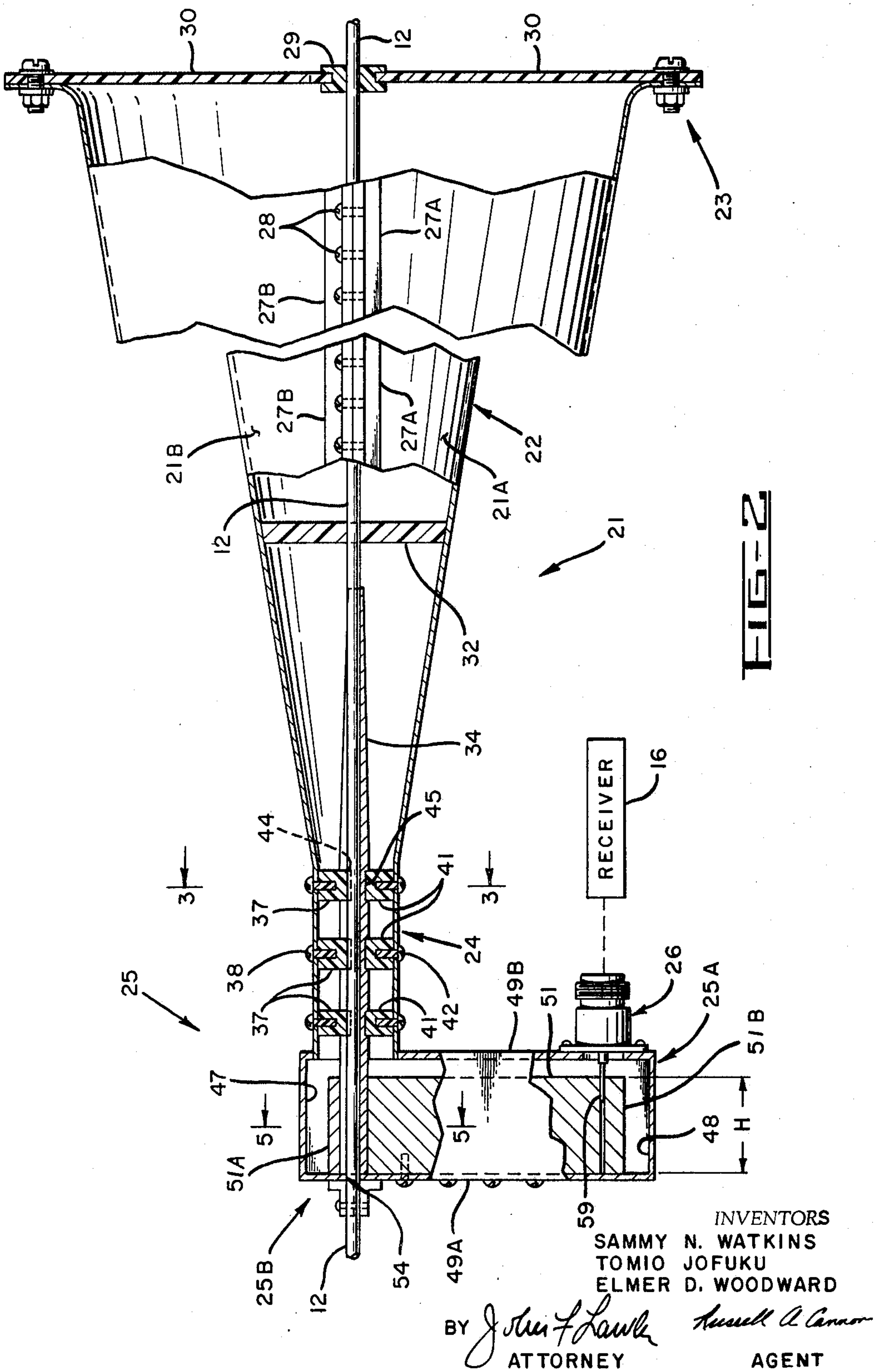
FIGURE 2 is a partially sectioned fragmentary elevation of one of the wave launchers utilized in the system of FIGURE 1.

Referring now to FIGURE 2, launcher 19 comprises a horn 21 having a flared section 22 tapering from a maximum transverse dimension at one end 23 to its junction with a straight section 24 at the opposite end. A waveguide coupler 25 is electrically connected to the straight section 24 of the horn and has a coaxial connector 26 for coupling energy between the Goubau line 12 and receiver 16 connected to the horn.

Horn 21 is a split construction having substantially identical parts 21A and 21B constituting halves of the horn. Similarly, coupler 25 is a split construction having parts 25A and 25B that are connected to horn parts 21A and 21B, respectively. The two pieces of the assembly, namely, the connected parts of the horn and coupler, are joined together along flanges 27A and 27B by screws 28 so that the entire assembly may be readily separated and joined together.

In order that there shall be a proper conversion of the mode of the wave on the line by the horn as well as appropriate impedance matching of these parts, line 12 must extend coaxially of the horn throughout its length. To this end, the line is supported in a dielectric washer 29 mounted on the front end 23 of the horn by radial dielectric spacers 30. Similarly, a transverse apertured washer like dielectric spacer 32 secured to the interior of the horn supports the line intermediate the ends of the horn. Additional support for the line is provided by center conductor sleeve 34 which extends from within the flared section of the horn through the straight section 24 into waveguide coupler 25. In addition to the support function, sleeve 34 in conjunction with the horn and straight section 24 electrically couples energy between the line and waveguide coupler 25. In other words, sleeve 34 is an inner conductor of a coaxial line having an outer conductor formed by the flared and straight sections of the horn, and this coaxial line is directly connected to coupler 25 for translation of energy from the line to utilization apparatus connected to the coupler.

Figure 3:
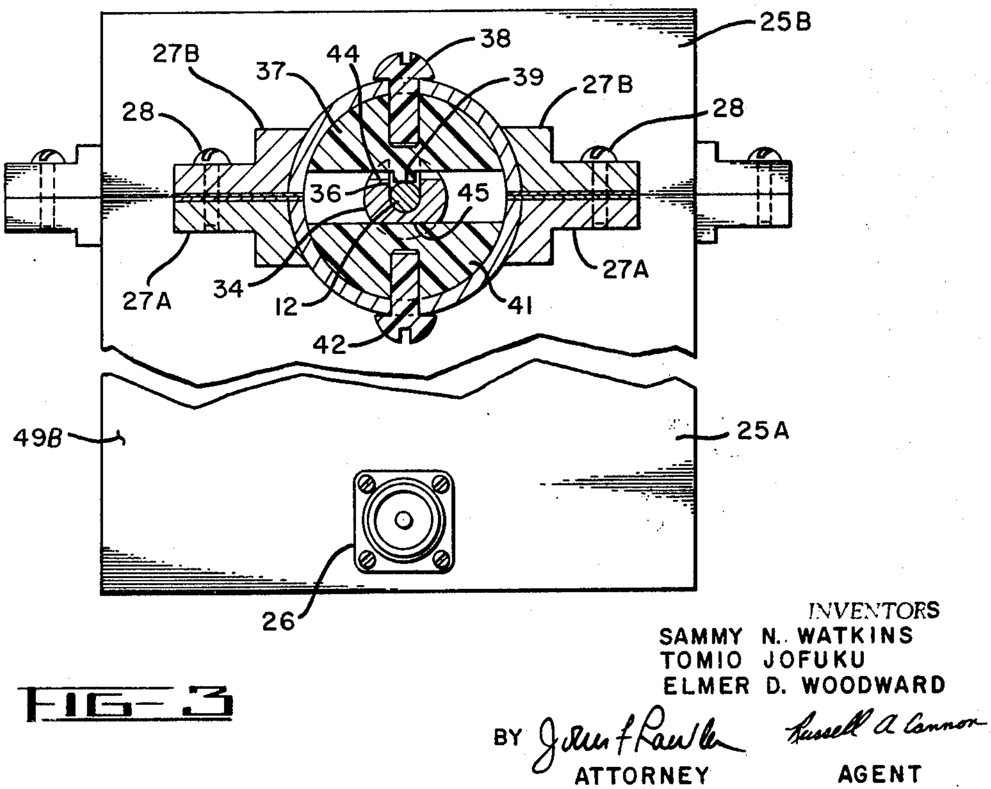
FIGURE 3 is a transverse section taken along line 3—3 of FIGURE 2.
Figure 4:
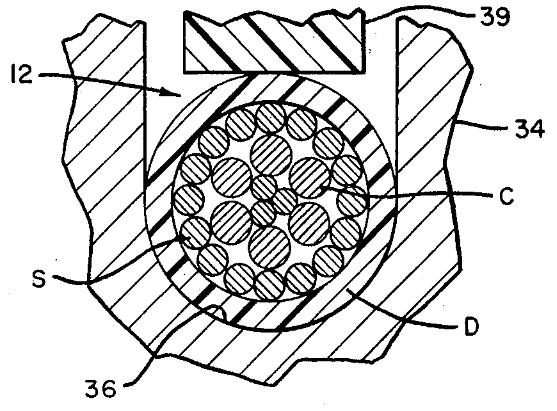
FIGURE 4 is a greatly enlarged view of the central portion of the assembly illustrated in FIGURE 3 showing the construction of the Goubau line.

In order to removably clamp the halves of the horn and coupler assembly on tether line 12, center conductor sleeve 34 is formed with a U-shaped longitudinal recess 36 having a width equal to the outside diameter of line 12, see FIGURES 3 and 4. A plurality (three as shown in FIGURE 2) of dielectric spacers 37 are secured by dielectric screws 38 to the wall of straight section 24 of the horn. Each spacer 37 has a projection 39 which extends into conductor recess 36 for engagement with the periphery of line 12. The projections 39 of the three spacers press line 12 tightly within the recess of sleeve 34 to achieve the proper transfer of energy between the line and the sleeve. A corresponding number of dielectric spacers 41 (see FIGURE 2) are secured opposite respective spacers 37 by dielectric screws 42 to provide support for the sleeve conductor.

In order to match the impedance of the coaxial line comprising sleeve 34 and section 24 to the coupler 25, sleeve 34 is formed with transverse slots 44 and 45 for receiving the inner ends of spacers 37 and 41, respectively. The depth, width, and longitudinal spacing of the slots is predetermined so as to provide broadband impedance matching of the tether line to the coaxial section of the horn.

As shown in FIGURE 4, line 12 comprises a core C (preferably a bundle of wires having high tensile strength), a coaxial sheath S of electrical conductors surrounding the core and a dielectric covering D encasing the conductors. The projection 39 on spacer 37 engages the dielectric covering D and presses the entire line tightly within recess 36 of sleeve 34.

Figure 5:
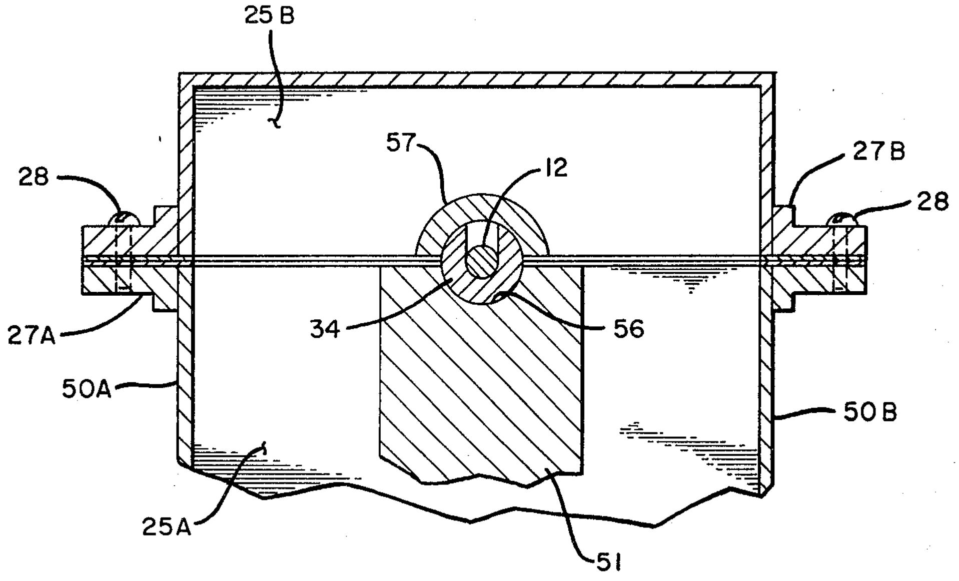
FIGURE 5 is an enlarged transverse section of the ridged waveguide coupler at the point of connection to the center conductor of the wave launcher, taken on line 5—5 in FIGURE 2.

Coupler 25 comprises a length of ridged waveguide closed at opposite ends by walls 47 and 48 and having broad walls 49 and narrow walls 50, see FIGURES 2 and 5. Ridge 51 is connected to broad wall 49A and is spaced from broad wall 49B. The ends 51A and 51B of the ridge are spaced from walls 47 and 48, respectively, so that the effective internal dimensions of the waveguide coupler beyond the ridge increase to such a value that propagation beyond the ridge of electromagnetic waves at the frequency of operation is prevented. In other words, the impedance of the coupler to waves transmitted along the ridged part is low but the impedance beyond the ends of the ridges is so high as to block propagation of the waves.

Horn section 21 is permanently secured to broad wall 49B of the coupler. Sleeve conductor 34 extends into the coupler and is electrically connected as by brazing to ridge

51 over the full height H of the ridge. An aperture 54 in coupler wall 49A in axial alignment with the axis of sleeve conductor 34 permits line 12 to extend through and beyond coupler 25.

Ridge 51 has a U-shaped recess 56 for receiving the extension of conductor sleeve 34 which is brazed thereto (see FIGURE 5). A cap 57 secured to coupler part 25B is formed to fit over and enclose the exposed portion of sleeve 34 and constitutes the extremity of the ridge for electrical purposes. When coupler part 25B is removed from coupler part 25A, cap 57 is disengaged from electrical contact with the main body of ridge 51 to expose line 12 for transverse removal from the sleeve.

In order to transfer energy between coupler 25 and receiver 16, connector 26 has a center conductor 59 directly electrically connected to ridge 51 remote from the input to the coupler and adjacent to the end of the ridge as shown in FIGURE 2.

In operation, the tether line or cable is secured to the balloon which is then filled with an appropriate gas such as helium. When the tether cable is raised to a vertical position by the inflated balloon signal generator 15 is secured to the balloon and tether cable. After the two halves of wave launcher 18 are positioned so that the tether cable is located in the recess 36 in sleeve 34, the halves of launcher 18 are connected together by screws 28. The wave launcher 18 is then rigidly secured to the tether line and balloon by a flange (not shown) connected to the wall 49A of waveguide coupler 25. After the signal generator is connected to wave launcher 18 by coaxial cable 17, the tether cable is reeled out by the winch so the signal generator and wave launcher are raised by the balloon to an elevated position.

When the signal generator is at a desired elevation the tether cable is secured by the winch. After mounting block 60 is secured to the tether line, the two halves of wave launcher 19 are positioned with the tether cable located in the recess 36 of sleeve 34. The halves of launcher 19 are then secured together by screws 28. Wave launcher 19 is secured and held in a fixed vertical position by mounting block 60.

Signals produced by generator 15 are coupled on coaxial line 17 to the waveguade coupler of launcher 18. The $TE_{10}$ mode signals supported by the waveguide coupler are converted to TEM mode signals in the coaxial line comprising straight section 34 and sleeve 34. These TEM mode signals are then converted by flared section 22 to $E_{00}$ mode signals or surface waves which are transmitted on the tether line (the Goubau type signal-conductor transmission line). The surface waves are received by the launcher 19 and converted to TEM mode signals in the flared section 22 thereof. These TEM mode signals are then converted to $TE_{10}$ mode signals in the junction between section 24 and coupler 25 and are coupled through the waveguide coupler and coaxial line 20 to the receiver.

By way of example, a successfully tested system including a pair of wave launchers of the type described herein above had the following characteristics and dimensions:

Horn 21:
- Axial length of straight section 24—2 inches
- Axial length of flared section 22—15 inches
- Diameter of section 22 at end 23—6.4 inches
- Inner diameter of section 24—0.8 inch
- Maximum diameter of sleeve 34—0.3 inch
- Length of sleeve 34 in section 22—2.95 inches Waveguide coupler 25:
- Width of broad wall 49—2.975 inches
- Height of narrow wall 50—1.295 inches
- Length of waveguide cavity 25—5.3 inches
- Height H of ridge 51—1.08 inches
- Length of ridge 51—4.8 inches Tether cable 12:
- Diameter of sheath S—0.090 inch
- Dielectric thickness—0.020 inch Diameter of dielectric D—0.130 inch
Length (between wave launchers)—1,000 feet
VSWR—<2.0:1
Frequency Band—1.5–3.5 gHz.
Loss (maximum)—43 db The loss on a similar length of conventional coaxial cable is in the order of 250 db.

Although this invention has been described in relation to a specific embodiment thereof, variations and modifications will be apparent to those skilled in the art. Thus, the scope and breadth of this invention is to be determined from the following claims rather than from the above detailed description.

What is claimed is:

1. A communication system comprising
an elongated electrically conductive line having an external dielectric covering,
means for suspending said line over ground whereby said line supports propagation of electromagnetic waves in the manner of a surface wave transmission line, and
means for coupling said waves between said line and utilization apparatus comprising
a longitudinally-split conductive horn having a flared section and a straight section and comprising two half parts removably joined together along a plane,
a conductive sleeve supported coaxially within said straight section and projecting from opposite ends thereof, said sleeve having a longitudinal U-shaped slot throughout its length for receiving said line,
a transversely-split ridged waveguide coupler comprising two parts connected to the respective parts of said straight section at one end thereof, said coupler having end walls and a longitudinal central ridge spaced from said end walls and extending transversely of the axis of said straight section,
said sleeve being electrically connected to said ridge,
said coupler having a broad wall opposite the connection thereof to said straight section, said broad wall having an aperture aligned with said sleeve through which said line extends, and
means for electrically connecting said utilization apparatus to said coupler.

2. A system according to claim 1 in which the two parts of the coupler are removably joined together along said junction plane of the horn.

3. A system according to claim 2 with a plurality of dielectric spacers supporting said sleeve within said straight section, certain of said spacers being connected to the part of said straight section facing the slot in said sleeve and having projections engageable with the covering on said line whereby the latter is tightly pressed within said sleeve when the parts of the horn are assembled.

4. In a communications system of the type described including a surface wave transmission line, a wave launcher connected between utilization apparatus and said line comprising
a longitudinally split flared conductive horn having a longitudinally recessed coaxially disposed conductive sleeve projecting from one end thereof,
a transversely split waveguide having a central ridge and connected to said end of the horn with said sleeve electrically connected to the ridge,
said waveguide having end walls spaced from the respective ends of said ridge and having an aperture in the wall opposite said horn and aligned with the recess in said sleeve, and
means for transferring energy between said waveguide and said utilization apparatus.

5. The launcher according to claim 4 in which the joinable parts of the horn are permanently connected to the joinable parts, respectively, of the waveguide, the horn and waveguide having a common junction plane.

6. The launcher according to claim 5 in which the width of the recess in the sleeve is substantially the same as the outside diameter of the line whereby the latter is seated therein when said parts of the horn and waveguide are joined around the line.

7. The launcher according to claim 6 with longitudinally spaced dielectric spacers supporting the sleeve within said horn, at least some of said spacers having projections aligned with the recess in said sleeve adapted to engage said line when said parts are joined together.

8. The launcher according to claim 4 in which the spacing between said end walls and said ridge is of such magnitude that a high impedance is presented to waves in the waveguide beyond said ridge.

References Cited

UNITED STATES PATENTS

| | | | |
|---|---|---|---|
| 2,946,970 | 7/1960 | Hafner. | |
| 3,241,145 | 3/1966 | Petrides | 325—115 |
| 3,290,626 | 12/1966 | Hafner | 179—82 |
| 3,380,059 | 4/1968 | Pearlman | 333—95 |
| 3,458,862 | 7/1969 | Franks | 333—95 |

ROBERT L. GRIFFIN, Primary Examiner

A. J. MAYER, Assistant Examiner

U.S. Cl. X.R.

325—115; 333—95, 95s; 340—189